(12) United States Patent
Juen et al.

(10) Patent No.: US 6,207,722 B1
(45) Date of Patent: Mar. 27, 2001

(54) FOAM CONTROL COMPOSITIONS HAVING RESIN-FILLERS

(75) Inventors: Donnie Ray Juen, Sanford; Bianxiao Zhong, Midland, both of MI (US); Mercedes Diaz, Mersch (LU); Tessa Johnson, Gijzegem (BE)

(73) Assignees: Dow Corning Corporation, Midland, MI (US); Dow Corning S.A., Seneffe (BE)

( * ) Notice: Subject to any disclaimer, the term of this patent is extended or adjusted under 35 U.S.C. 154(b) by 0 days.

(21) Appl. No.: 09/224,400

(22) Filed: Dec. 31, 1998

(51) Int. Cl.$^7$ .............................. B01D 19/04; C08L 83/04
(52) U.S. Cl. .................. 516/123; 516/115; 516/117; 516/135; 516/139; 524/588; 524/837; 524/858; 525/474; 525/477; 525/478; 252/315.1; 252/318; 252/321; 252/352; 252/363.5
(58) Field of Search ................................ 516/123, 117, 516/115, 135, 139; 252/315.1, 318, 321, 352, 363.5; 524/588, 837, 858; 525/474, 477, 478

(56) References Cited

U.S. PATENT DOCUMENTS

| | | |
|---|---|---|
| 3,383,327 | 5/1968 | Sullivan . |
| 3,419,593 | 12/1968 | Willing . |
| 3,445,420 | 5/1969 | Kookootsedes et al. . |
| 3,455,839 | 7/1969 | Rauner et al. . |
| 3,984,347 | 10/1976 | Keil . |
| 4,012,334 | 3/1977 | Raleigh et al. . |
| 4,076,648 | 2/1978 | Rosen . |
| 4,145,308 | 3/1979 | Edward . |
| 4,443,357 | 4/1984 | Maloney et al. . |
| 4,486,336 | 12/1984 | Pape et al. . |
| 4,554,331 | 11/1985 | Fey et al. . |
| 4,639,489 | 1/1987 | Aizawa et al. . |
| 4,749,740 | 6/1988 | Aizawa et al. . |
| 4,762,640 | 8/1988 | Schiefer . |
| 5,082,590 * | 1/1992 | Araud ................................. 252/321 |
| 5,091,484 | 2/1992 | Colas . |
| 5,693,256 * | 12/1997 | Sawicki et al. .................... 252/321 |
| 5,914,362 * | 6/1999 | Brecht ................................ 524/268 |
| 6,075,087 * | 6/2000 | Juen et al. ......................... 524/588 |

FOREIGN PATENT DOCUMENTS

| | | |
|---|---|---|
| 0217501 | 7/1986 | (EP) . |
| 341952 | 5/1989 | (EP) . |
| 1505655 | 10/1974 | (GB) . |
| 87318582 | 12/1989 | (JP) . |

OTHER PUBLICATIONS

Garrett, P.R., Ed., Defoaming: Theory and Industrial Applications, Surfactant Series 45, 1993, 246–249.

* cited by examiner

Primary Examiner—Robert Dawson
Assistant Examiner—Jeffrey B. Robertson
(74) Attorney, Agent, or Firm—Timothy J. Troy; Charles R. Richard

(57) ABSTRACT

The present invention relates to a foam control composition and to its use in foaming systems. More particularly, this invention relates to a foam control composition comprising a polysiloxane and a resin-filler made from MQ resins having at least one polyoxyalkylene group. The compositions of this invention exhibit excellent defoam effects and antifoam persistency.

13 Claims, No Drawings

FOAM CONTROL COMPOSITIONS HAVING RESIN-FILLERS

FIELD OF THE INVENTION

The present invention relates to a foam control composition and to its use in foaming systems. More particularly, this invention relates to a foam control composition comprising a polysiloxane and a resin-filler. The compositions of this invention exhibit excellent antifoam properties.

BACKGROUND OF THE INVENTION

A defoamer or antifoam agent is a material which, when added in low concentration to a foaming liquid controls the foam problem. Such materials, in addition, remove unsightly and troublesome surface foam and improve the filtration, watering, washing, and drainage of various types of suspensions, mixtures, and slurries. Defoamers have found application traditionally in such areas of use as the pulp and paper industry, paints and latex, coating processes, fertilizers, textiles, fermentation processes, metal working, adhesive, caulk and polymer manufacture, the sugar beet industry, oil well cement, cleaning compounds, detergents, cooling towers, and in chemical processes of varied description such as municipal and industrial primary and secondary waste water treatment.

It is essential for a defoamer that it be inert and not capable of reacting with the product or system in which it is used, and that it have no adverse effect on the product or system. A silicone antifoam agent is favorable, because it is chemically stable, rarely affects the treatment process, and exhibits a relatively high antifoam effect even in small amounts.

The use of various silicone containing compositions as antifoams or defoamers is known. In this regard, it is well established that this art is highly unpredictable and slight modifications can greatly alter the performance of such compositions. Most of the compositions contain silicone fluid (usually dimethylpolysiloxane), often in combination with small amount of silica filler. Many silicone foam control agents are known to suppress foam.

For example, Sullivan, in U.S. Pat. No. 3,383,327, discloses an antifoam agent prepared from a polydiorganosiloxane fluid, silica, and a hydroxylated polydimethylsiloxane. Rauner, in U.S. Pat. No. 3,455,839, discloses an aqueous defoaming composition consisting essentially of a polydimethylsiloxane fluid, a resin composed of $(CH_3)_3SiO_{1/2}$ units and $SiO_2$ units and a silica aerogel.

Raleigh et al., in U.S. Pat. No. 4,012,334, disclose an antifoam composition comprising a dimethylpolysiloxane and a precipitated silica reacted with hexamethyldisilazane and a process for the preparation and use thereof. Edward, in U.S. Pat. No. 4,145,308, discloses foam suppressant compositions, useful in both aqueous and hydrocarbon liquids, consisting essentially of a polydimethylsiloxane, a silicone resin comprised of $R_3SiO_{1/2}$ units and $SiO_2$ units wherein R is a monovalent hydrocarbon radical, and fumed or precipitated silica.

Maloney et al., in U.S. Pat. No. 4,443,357, disclose a foam controlling composition consisting essentially of an organopolysiloxane having at least one terminal alkoxy or hydroxy group, an organic silicone compound having the general formula $R_2SiZ_2$ wherein R is a monovalent hydrocarbon group and Z is a hydrolyzable group containing nitrogen, and silica. Pape et al., in U.S. Pat. No. 4,486,336, disclose foam suppressant compositions consisting essentially of a low viscosity polydimethylsiloxane, a high viscosity polydimethylsiloxane, a silicone resin comprising $(CH_3)_3SiO_{1/2}$ units and $SiO_2$ units, and silica.

John, in EP 0 217 501 teaches a foam control composition having a liquid siloxane component having a certain viscosity and a liquid siloxane component obtained from a triorganosiloxane-endblocked polydiorganosiloxane, a polydiorganosiloxane having at least one terminal silanol group and an organosiloxane resin. Keil, in GB 1 505 655 teaches the use of silicone glycol molecules as defoamers. A process for controlling foaming in highly acidic aqueous systems using a silicone foam control agent is disclosed in U.S. Pat. No. 4,762,640. The foam control agent consists essentially of (A) a dimethylpolysiloxane gum having a viscosity greater than 150,00 Poise at 25° C. and (B) a non ionic surfactant, (C) a siloxane copolymer dispersing agent and, optionally, (D) water. Additionally, other anti-foaming agents are disclosed in JP 87318582.

In Fey, U.S. Pat. No. 4,554,331, it is taught that certain compositions can be produced from reactive liquid resins and a compound selected from acyloxysilanes, alkoxysilanes, and oximosilanes. U.S. Pat. No. 5,091,484 to Colas teaches the use of hydroxyl, trialkoxy, or alkylene-trialkoxy end-blocked polydiorganosiloxane and a special MG resin.

Aizawa et al., in U.S. Pat. Nos. 4,639,489 and 4,749,740 teach a method for producing a silicone defoamer composition wherein a complex mixture of polyorganosiloxanes, filler, a resinous siloxane, and a catalyst, to promote the reaction of the other components, are heated together at 50° C. to 300° C.

Hydrophobed silica/polydimethylsiloxane antifoams are also reviewed in *DEFOAMING: Theory and Industrial Applications*; Garrett, P. R., Ed.; Surfactant Science Series 45; Marcel Dekker: New York, 1993, especially pages 246–249.

Additionally, these silicone antifoam agents may include various surfactants and dispersing agents in order in impart improved foam control or stability properties to the compositions. Thus, for example, Rosen, in U.S. Pat. No. 4,076,648, teaches self-dispersible antifoam compositions consisting essentially of a lipophilic nonionic surface active agent homogeneously dispersed in a non-emulsified diorganopolysiloxane antifoam agent. This combination is said to promote dispersability in water without the need for emulsification.

Keil, in U.S. Pat. No. 3,984,347, discloses a composition for controlling foam which comprises (1) a base oil of polyoxypropylene polymers, polyoxypropylene-polyoxyethylene copolymers or siloxane glycol copolymers, (2) an antifoam agent comprising a liquid polydimethylsiloxane, silica, and optionally a siloxane resin and (3) a siloxane copolymer dispersing agent. This composition enables the introduction of a diluted antifoam agent without having to make a water based emulsion.

McGee et al. in European Patent Application No. 341,952 disclose a foam control composition comprising (I) a silicone defoamer reaction product and (II) a silicone glycol copolymer, which is disclosed as being particularly effective in defoaming highly acidic or highly basic aqueous systems. However, when a foam control composition comprising a silicone antifoam agent and a silicone glycol copolymer is employed it is added in the form of a liquid or after dilution with water to a foamable liquid thus requiring higher levels of the silicone copolymer.

SUMMARY OF THE INVENTION

The present invention relates to a foam control composition comprising a polysiloxane and a resin-filler.

It is an object of this invention to provide foam control compositions which exhibit excellent antifoam properties.

These and other features, objects and advantages of the present invention will be apparent upon consideration of the following detailed description of the invention.

DETAILED DESCRIPTION OF THE INVENTION

The present invention relates to a foam control composition comprising: (I) a polysiloxane and (II) a resin-filler.

The compounds or compositions employed as the polysiloxane (I) herein can be alkylated polysiloxane compounds of several types, and can be used alone, or in combination with various solid materials such as silica aerogels, xerogels, or hydrophobic silicas of various types. In general terms, the polysiloxane can be siloxanes having the unit formula:

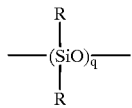 (1)

wherein q has a value ranging from about 20 to about 2,000, and R is independently selected from the group consisting of alkyl and aryl groups. Preferred alkyl groups include methyl, ethyl, propyl, and butyl, and preferred aryl groups include phenyl. Polydimethylsiloxanes (where both R's are methyl) having a molecular weight within the range of from about 2,000 to about 200,000, or higher, are all useful as antifoam agents in the present invention. Such silicone compounds are commercially available from Dow Corning Corporation under the trade name Dow Corning® 200 Fluid.

Branched polysiloxanes, which are also well known in the art, are also useful to the practice of the present invention. In particular, preferred branched polymers are described in U.S. Pat. No. 4,639,489 issued to Aizawa et al. on Jan. 27, 1987, which is incorporated herein by reference. The branched polymers taught in Aizawa are made by branching silanol-terminated polysiloxanes with a silanol-functional MQ resin by a condensation reaction.

Additionally, other silicone compounds where the side chain groups, R, are independently selected from the group consisting of alkyl, aryl, or mixtures of alkyl and aryl groups exhibit useful foam controlling properties. These compounds are readily prepared by the hydrolysis of the appropriate alkyl, aryl or mixtures of alkylaryl silicone dichlorides with water in a manner well known in the art. Specific examples of such polysiloxanes useful as (I) include diethyl polysiloxanes, dipropyl polysiloxanes, dibutyl polysiloxanes, methylethyl polysiloxanes, and phenylmethyl polysiloxanes. Dimethyl polysiloxanes are particularly useful herein due to their low cost and ready availability.

Preferably, the polysiloxanes of the present invention will be non-functional, but it is expected that functional polysiloxanes having OH, alkenyl, Si—H, etc., functionalities would work as well.

Component (II) of the foam control compositions of this invention is a resin-filler. The resin-filler comprises the reaction product of component (A), a vinyl-functional MQ resin, and component (B), a substantially linear polydiorganosiloxane having silicon bonded hydrogen atoms.

Component (A) is a solid vinyl-functional MQ resin having the average general unit formula

wherein: $R^1$ is a hydroxyl group, $R^2$ is a monovalent hydrocarbon group having at least one unsaturated bond between at least two adjacent carbon atoms (i.e., vinyl) that is capable of addition reaction with a silicon-bonded hydrogen atom; each $R^3$ is an alkyl, aryl or arylalkyl group, wherein the $R^3$ groups may be the same or different, a is a number from 0 to 0.2, b is number from 0.02 to 1.50, and c is a number from 0 to 1.48, with the proviso that $1 \leq a+b+c \leq 1.5$. $R^2$ is preferably a vinyl group. $R^3$ is preferably a methyl group.

If a+b+c is less than 1, component (A) cannot be dissolved in a diluent. If a+b+c is greater than 1.5, then component (A) will not be a solid, but rather a viscous liquid. If b is less than 0.02, then the resin-filler may not be an insoluble solid after the volatile diluent is removed therefrom, or the resin-filler may not dramatically increase the viscosity of the nonvolatile diluent in which the resin-filler is dispersed. Preferably, a is 0.03 to 0.1, b is 0.04 to 0.1, c is 1.18 to 1.33, and the quantity a+b+c is 1.25 to 1.45.

Component (B) is a substantially linear polydiorganosiloxane of the empirical formula:

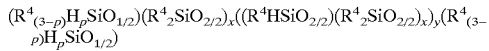

wherein each $R^4$ is a monovalent group independently selected from the group consisting of alkyl, aryl, and arylalkyl groups, p is 0 or 1, x ranges from 0 to 70, and y ranges from 0 to 100, with the proviso that at least two silicon-bonded hydrogen atoms are present in each molecule. $R^4$ is preferably methyl; p is preferably 0; x is preferably 0 to 1, and y is preferably 6 to 15.

Components (A) and (B) of this invention are both soluble in solvents and silicone polymers. The resin-fillers with a desired range of aggregate sizes can be made by reacting (A) and (B) in a controlled fashion.

This invention further relates to a method for preparing the resin-filler in-situ in a diluent. The method comprises heating a reaction mixture comprising components (A) and (B) described above in the presence of component (C), a catalyst; and component (D), a diluent. Components (A), (B), and (C) are dissolved in component (D). Component (E), an optional catalyst inhibitor, may also be added to the reaction mixture.

Components (A) and (B) are typically reacted in a weight ratio of (A):(B) equal to 1.4:1 to 22:1. Preferably, (A):(B) is 2.6:1 to 9.0:1, and more preferably 2.6:1 to 6.7:1. However, the exact ratio used depends the number of Si—H groups of each molecule of component (B) and the degree of polymerization of component (B). The amounts of components (A) and (B) are selected such that the reaction product thereof is insoluble in solvents. Preferably, the amounts of components (A) and (B) are selected such that the reaction product thereof increases the viscosity of a silicone polymer composition by at least 1,000% when 10 weight % of the reaction product is present in the composition.

The applicants believe that the following guidelines will allow one skilled in the art to select an appropriate (A):(B) ratio without undue experimentation. In general, for a given MQ resin for component (A) and a given linker for component (B), as the amount of component (B) increases, the degree of copolymerization between (A) and (B) increases to a maximum, and thereafter decreases as the amount of component (B) continues to increase. Correspondingly, the viscosity of a silicone polymer diluent containing a resin-filler increases as the amount of component (B) increases to the maximum, and thereafter viscosity decreases as the amount of component (B) continues to increase. It is thought that when excess (A) is present and primary particles begin to form, the particles begin to aggregate as the amount of (B) increases relative to the amount of component (A) until a maximum aggregate particle size is reached. When the amount of component (B) continues to increase after the maximum size is reached, excess component (B) begins to endcap component (A) instead of linking 2 molecules of component (A) together. This causes aggregate particle size to decrease.

If the amount of component (A) is too high (e.g., (A):(B) is >22:1), then the resin-filler may be soluble in solvents, or it may not increase the viscosity of the polymer dramatically, or both. If the amount of component (B) is too high (e.g., (A):(B) is <1.4:1), then the resin-filler may not be brittle, it may be soluble in solvents, or it may not increase the viscosity of the polymer dramatically, or combinations thereof.

For a given MQ resin for component (A) and a given linker containing two Si—H functionality on the ends, as the degree of polymerization of component (B) ($DP_{(B)}$) decreases (not smaller than 5 however), the degree of the copolymerization reaction increases, and the reaction product will become less soluble in volatile liquids or the viscosity of a silicone polymer composition comprising the copolymerized reaction product of (A) and (B) will increase.

Components (A) and (B) are reacted by addition reaction. When the diluent (D) is a polymer, the components (A) and (B) are dispersed in (D) by stirring or shear mixing. After the catalyst (C) and optionally an inhibitor (E) are dispersed into the mixture by stirring or shear mixing, the composition is typically heated to a temperature of 20 to 200° C., preferably 100 to 120° C. for 1 to 4 hours to carry out the addition reaction. If the reaction is carried out at a temperature higher than 200° C., the polymer may decompose. A catalyst, component (C), is required to promote the reaction.

Component (C) is an addition reaction catalyst, preferably a platinum catalyst. Suitable addition reaction catalysts are described in U.S. Pat. No. 3,419,593 to Willing, Dec. 31, 1968, which is hereby incorporated by reference for the purpose of describing suitable catalysts. Component (C) is exemplified by chloroplatinic acid, alcohol solutions of chloroplatinic acid, complexes of platinum compounds with unsaturated organic compounds such as olefins, and complexes of platinum compounds with organosiloxanes containing unsaturated hydrocarbon groups, where these complexes of platinum with organosiloxanes can be embedded in organosiloxane resins. Component (C) is preferably a complex of platinum with an organosiloxane. Component (C) is most preferably is a complex of platinum with 1,3-diethenyl-3,3-tetramethyldisiloxane or such complex embedded in an organosiloxane resin with methyl and phenyl functional groups. Component (C) is typically added in an amount such that the reaction mixture contains 0.2 to 40 ppm by weight of platinum, preferably 1 to 10 ppm.

Components (A), (B), and (C) are dissolved in component (D), a diluent selected from the group consisting of volatile and nonvolatile liquids, to form the reaction mixture. The volatile liquid can be an organic solvent or a low viscosity polyorganosiloxane. Examples of suitable organic solvents include alkanes such as hexane and heptane; aromatic solvents such as toluene, xylene, and benzene; and ketones. Low viscosity polyorganosiloxanes typically have viscosity less than 100 mPa·s and are exemplified by octamethylcyclotetrasiloxane and decamethylcyclopentasiloxane. When component (D) is a volatile liquid, it can be removed from the reaction mixture after components (A) and (B) have reacted. The resulting resin-filler will be insoluble in solvents after the volatile liquid has been removed from the reaction mixture. Volatile liquids can be replaced with a nonvolatile liquid such as polysiloxane after the resin-filler is formed by adding the novolatile liquid and stripping off the volatile liquid.

Alternatively, component (D) can be a nonvolatile liquid, such as a nonvolatile silicone polymer, exemplified by high viscosity polydiorganosiloxanes. In particular, component (D) can also be the polysiloxane (I). High molecular weight polydiorganosiloxanes typically have viscosity in the range of greater than 100 mPa·s to 10 million mPa·s or higher; but preferably, viscosity is in the range of 1,000 to 30,000 mPa·s. The high molecular weight polydiorganosiloxane may have a linear or branched structure. When component (D) is a nonvolatile liquid, the MQ resin component (A) can be either added as a neat powder or a solution in polymer (D), and the resin-filler will be produced in-situ therein by the reaction of components (A) and (B).

Component (E), an optional inhibitor, can also be added to the reaction mixture. Component (E) can be any addition reaction catalyst inhibitor. Suitable inhibitors are disclosed in U.S. Pat. No. 3,445,420 to Kookootsedes et al., May 20, 1969, which is hereby incorporated by reference for the purpose of describing catalyst inhibitors. Component (E) can be an amine such as trialkylamine, an oxime, a peroxide such as hydrogen peroxide, or an acetylenic compound such as dialkylacetylene, dicarboxylates, and acetylenic alcohols such as methylbutynol or ethynyl cyclohexanol. Component (E) is preferably ethynyl cyclohexanol. Component (E) comprises 0 to 0.05 weight percent of the composition.

The resin-fillers and methods of making same are more fully described in U.S. Ser. No. 09/224,415 RESIN-FILLERS PRODUCED IN-SITU IN SILICONE POLYMER COMPOSITIONS METHOD FOR PREPARATION OF THE COMPOSITIONS which is incorporated herein by reference.

The foam control compositions of the present invention can be produced by preparing resin-filler (II) in-sitit in a polysiloxane (I). Such compositions may contain 100 parts by weight of polysiloxane (I) with 0.5 to 30 parts by weights of resin-filler (II), preferably with 2 to 15 parts by weights of resin-filler (II), and more preferably with 3 to 10 parts by weights of resin-filler (II).

The foam control compositions of the present invention may contain other components on an optional basis insofar as the object of the present invention is not impaired, for example, inorganic fillers such as quartz, biocides when water is present, silica including hydrophobically treated silicas, metal hydroxide micropowders such as aluminum hydroxide micropowder, calcium hydroxide micropowder, and magnesium hydroxide micropowder, flake-form fillers such as mica, and epoxy-functional diorganopolysiloxanes, as well as pigments, corrosion inhibitors, silicone polyethers and dyes.

The foam control composition of the present invention is added to a foamable liquid without dilution in the form of a liquid, or after dilution with water or other appropriate solvent. It can also be added as an emulsion after emulsification with a surfactant and water, or as a powder after encapsulation with zeolites or other solids. The foamable liquid may be a concentrate or be present at end-use levels. The compositions of the present invention can be used as any kind of foam control agents, i.e. as defoaming agents and/or antifoam agents. Defoaming agents are generally considered as foam reducers whereas antifoam agents are generally considered as foam preventors. The compositions of the present invention find utility as foam control compositions in various media or foamable liquids such as inks, coatings, paints, detergents (i.e. compositions which contain surfactants with or without detergency builders) such as liquid detergents, heavy duty liquid detergents and textile scours, black liquor, and pulp and paper manufacture.

From the tables and examples below, it is apparent that the foam control compositions of the present invention are excellent in not only the initial defoam effect but also the persistence of the antifoam effect. All parts and percentages in the examples are on a weight basis and all measurements in the examples and as disclosed in throughout were made at 25° C. unless indicated to the contrary.

Example 1

A solution of 63% component (A), a vinyl-functional MQ resin having formula $(Me_3SiO_{1/2})_{0.39}(Me_2ViSiO_{1/2})_{0.06}(OH)_{0.06}(SiO_{4/2})_{0.55}$ in xylenes was mixed with a $Me_3SiO$-end-capped polydimethylsilxoane with viscosity of 1000 mPa·s to produce a clear solution. The solution was rotovapped at 90° C. in vacuum to strip off xylenes. The resulting composition had 50 weight parts vinyl-functional MQ resin and 50 parts polyorganosiloxane. The vinyl-functional MQ resin had a vinyl content of 2.3 wt %.

77 g of the above MQ resin/polydimethylsiloxane blend, 13.9 g of Component (B), a methylhydrogensiloxane with formula $Me(SiMe_2O)_4(SiHMeO)_8SiMe_3$, 0.9 g of (C), a 1.5 wt.% solution of a complex of platinum with 1,3-diethenyl-1,1,3,3-tetramethyldisiloxane in a dimethylvinylsiloxy-ended polydimethylsiloxane (450 mPa·s), and 433 g of (D), a branched polydimethylsiloxane having a viscosity of 17,000 mPa·s prepared according to procedures described in U.S. Pat. No. 4,639,489 to Aizawa et al. in Jan. 27, 1987, were mixed in a 2 liter beaker with a Silverson high shear mixer for 15 min during which the blend became hot and viscous. 524 g of additional (D) was added, and the mixture was mixed with a Silverson high shear mixer for 25 min. The final material was heated at 100° C. for 1 hour.

The resulting antifoam composition is a branched polysiloxane containing 5% resin filler.

Example 2

A solution of 63% component (A), a vinyl-functional MQ resin having formula $(Me_3SiO_{1/2})_{0.39}(Me_2ViSiO_{1/2})_{0.06}(OH)_{0.06}(SiO_{4/2})_{0.55}$ in xylenes $Me_3SiO$-end-capped polydimethylsilxoane with viscosity of 1000 mPa·s to produce a clear solution. The solution was rotovapped at 90° C. in vacuum to strip off xylenes. The resulting composition had 50 weight parts vinyl-functional MQ resin and 50 parts polyorganosiloxane. The vinyl-functional MQ resin had a vinyl content of 2.3 wt %.

141.6 g of the above MQ resin/polydimethylsiloxane blend, 25.2 g of Component (B), a methylhydrogensiloxane with formula $Me(SiMe_2O)_4(SiHMeO)_8SiMe_3$, 2.1 g of (C), a 1.5 wt. % solution of a complex of platinum with 1,3-diethenyl-1,1,3,3-tetramethyldisiloxane in a dimethylvinylsiloxy-ended polydimethylsiloxane (450 mPa·s), and 1033 g of (D), a branched polydimethylsiloxane having a viscosity of 17,000 mPa·s prepared according to procedures described in U.S. Pat. No. 4,639,489 to Aizawa et al. in Jan. 27, 1987, were mixed in a 3 liter beaker with a Silverson high shear mixer for 15 min during which the blend became hot and viscous. The resulting material was heated at 100° C. for 1 hour, and mixed again with a Silverson high shear mixer for 25 minutes. The resulting antifoam composition is a branched siloxane containing 8% resin filler.

Example 3

A solution of 63% component (A), a vinyl-functional MQ resin having formula $(Me_3SiO_{1/2})_{0.39}(Me_2ViSiO_{1/2})_{0.06}(OH)_{0.06}(SiO_{4/2})_{0.55}$ in xylenes was mix $Me_3SiO$-end-capped polydimethylsilxoane with viscosity of 1000 mPa·s to produce a clear solution. The solution was rotovapped at 90° C. in vacuum to strip off xylenes. The resulting composition had 50 weight parts vinyl-functional MQ resin and 50 parts polyorganosiloxane. The vinyl-functional MQ resin had a vinyl content of 2.3 wt %.

82.6 g of the above MQ resin/polydimethylsiloxane blend, 14.7 g of Component (B), a methylhydrogensiloxane with formula $Me(SiMe_2O)_4(SiHMeO)_8SiMe_3$, 1.2 g of (C), a 1.5 wt. % solution of a complex of platinum with 1,3-diethenyl-1,1,3,3-tetramethyldisiloxane in a dimethylvinylsiloxy-ended polydimethylsiloxane (450 mPa·s), and 603 g of (D), a trimethylsiloxy-endcapped polydimethylsiloxane (12,500 mPa·s), were mixed in a 2 liter beaker with a Silverson high shear mixer for 10 min during which the blend became hot and viscous. The resulting material was heated at 100° C. for 1 hour, and mixed again with a Silverson high shear mixer for 25 minutes. The resulting antifoam composition is a linear siloxane containing 8% resin filler.

Ref. 1 is antifoam composition comprising 0.7 wt % water, 92.0 wt. % dimethyl siloxane, trimethylsiloxy-terminated, 8.0% dimethyl siloxane reaction with silica, 0.3 wt. % hydroxy-terminated dimethyl siloxane.

Method of Testing Antifoaming Properties for Paper Pulp

Each of the antifoam compositions prepared as hereinabove described or of reference compositions was emulsified to prepare a 10% emulsion using a surfactant premix in water. The premix was made in accordance with the following recipe:

TABLE I

Formulation of premix.

| Ingredient | Parts by weight |
| --- | --- |
| Water | 89.67 |
| Xanthan gum | 0.95 |
| Hydroxyethylcellulose | 2.72 |
| FF-400 Fibre Finish | 4.08 |
| Glyceryl monostearate | 2.17 |
| 2-benzisothiazoline-3-one 33% | 0.41 |

Emulsions were prepared by mixing 36.8 parts of the premix, 10 parts of the antifoam composition to be tested and 53.2 parts of water with an Ultra Turax mixer at 8000 rpm.

A hot pump test method was used. The foaming solution was a natural hard wood (birch/oak) liquor obtained from the MoDo Alice paper mill in France or Burgo Cellardenne in Belgium. One liter of foaming solution and 1 ml Tall oil acid were added to a 2 liter beaker (glass or metal) and heated to 90° C. The liquid was recirculated using a circulating pump until foam level reached 1800 ml. An emulsion containing 10% antifoam composition was added so that the level of antifoam composition in the foaming solution was 2 ppm (samples in Example 1–3 or references or Wacker Pulpsil 160C). Samples in Example 1–3 contained resin fillers and the reference samples contained conventional silica fillers. Once an emulsion was added, the foam height was reduced quickly to a minimum (defoaming level). The time to reach defoaming level for each sample was recorded as the number at the top of each column in Table II. Under continous circulating, the times required for foam to reach various levels are shown in Table II. The times to reach back 1800 mL represent antifoam persistency. All tests were shut down in 600 seconds. It should be noted that foam levels contain 1000 ml of foaming liquid, so a measurement of 1000 ml means an actual foam quantity of 0 ml.

Samples in Example 3 displayed some defoam and antifoam effects although it is not as good as the two reference samples. Samples in Exam. 1 and Exam. 2 displayed much better antifoam persistency than the two references. For samples in Exam. 1 and Exam. 2, foam levels reached the maximum when the experiments were shut down at 600 seconds. The sample in Example 2 also displayed excellent defoam ability.

TABLE II

Times (in seconds) required for foam height to reach various levels.

| Foam Height (ml): | Ref. 1 | Ref. 2 Wacker Pulpsil 160° C. | Exam. 1 | Exam. 2 | Exam. 3 |
|---|---|---|---|---|---|
| 1000 | 10 | | | 10 | |
| 1050 | 30 | 10 | | 15 | |
| 1100 | 40 | 15 | | 25 | |
| 1150 | 50 | 30 | 10 | 35 | |
| 1200 | 60 | 40 | 30 | 45 | 20 |
| 1250 | 100 | 60 | 65 | 50 | 25 |
| 1300 | 130 | 80 | 85 | 60 | 30 |
| 1350 | 150 | 95 | 120 | 90 | 35 |
| 1400 | 170 | 125 | 140 | 130 | 40 |
| 1450 | 190 | 180 | 180 | 210 | 45 |
| 1500 | 210 | 200 | 240 | 380 | 50 |
| 1550 | 240 | 220 | 300 | 530 | 75 |
| 1600 | 260 | 270 | 360 | 610 | 90 |
| 1650 | 280 | 320 | 480 | >600 | 100 |
| 1700 | 300 | 360 | >600 | | 110 |
| 1750 | 310 | 390 | | | 120 |
| 1800 | 330 | 420 | | | 130 |

Method of Testing Antifoaming Properties for Wash Machines

Each of the antifoam compositions in Examples 1–3 or references was encapsulated according to the following procedures: 12 parts of antifoam composition, 1.5 parts of a silicone glycol and 21.5 parts of Sokalan CP5 (40%) were stirred for 10 minutes at 800 RPM to obtain a emulsion, 65 parts of Wessalith P zeolite was then added to the emulsion, and the mixture was blended in a food stirrer two times in total 30 seconds. The resulting powder was then dried at 60° C. in a fluid bed.

All tests were done with a Miele 934 front loader wash machine. 23 white towels with a total weight of 3 kg and 72.5 P&G Ariel Futur Aout97 detergent powder were loaded to a wash machine, 17 liters of deionized water containing 5.24 g $CaC_{1.2}H_2O$ and 0.72 g $MgCl_{2.6}H_2O$ (for controlling hardness) was added, and then 8 g of encapsulated antifoam composition was added. Wash cycle was carried out at 95° C. for 60 minutes, and foam heights (expressed as the percentage of window heights, so 0 represents 0 foam height, 50 represents foam height at 50% window height, and 100 represents a full window) were recorded every 5 minutes with a video camera.

Antifoam composition in Reference 3 was prepared by mixing 8 parts of Cab-O-Sil TS 530 treated fumed silica and 92 parts of a branched polydimethylsiloxane having a viscosity of 17,000 mPa·s prepared according to procedures described in U.S. Pat. No. 4,639,489 to Aizawa et al. on Jan. 27, 1987 with a Silverson mixer for 10 minutes.

Antifoam composition in Reference 4 was prepared by mixing 8 parts of Cab-O-Sil TS 530 treated fumed silica and 92 parts ) of a trimethylsiloxy-endcapped polydimethylsiloxane (12,500 mPa·s), with a Silverson mixer for 10 minutes.

Reference 5 was a powdered antifoam, comprising the ingredients 59.0 wt. % zeolites 15.0 wt. % water, 0.2 wt. % acetate of polyether polyol, 12.0 wt. % acrylic acid/maleic acid copolymer sodium salt, 0.7 wt. % alpha-allyl omega-acetate poly((eo)(po)), 8.0 wt. % dimethyl siloxane, trimethylsiloxy-terminated, 2.0 wt. % dimethyl, methyl (propyl(poly(eo)(po))acetate) siloxane, trimethylsiloxy-terminated, 2.0 wt. % dimethyl siloxane, hydroxy-term with 406-type resin, 0.3 wt. % hexamethyldisilazane treated silica, and 1.0 wt. % dimethyl siloxane, hydroxy-terminated. It was already encapsulated, so it was added directly (8 g) with encapsulation in the test.

All samples in Exam. 1–3 displayed significant antifoaming property when compared to reference samples containing a commercial filler and the same siloxanes. Sample in Exam. 3 showed excellent antifoam performance even when compared with a commercial antifoam product, there was no foam at all until 30 minutes in this test.

TABLE III

Foam heights (averages of 3 runs) in wash machine tests, expressed in % of machine window height.

| Sample | 5 min | 10 min | 15 min | 20 min | 25 min | 30 min | 35 min | 40 min | 45 min | 50 min | 55 min | 60 min |
|---|---|---|---|---|---|---|---|---|---|---|---|---|
| Ex. 1 | 0 | 0 | 10 | 30 | 50 | 67 | 100 | 100 | 100 | 100 | 100 | 100 |
| Ex. 2 | 0 | 47 | 57 | 97 | 100 | 97 | 100 | 100 | 100 | 100 | 100 | 100 |
| Ex. 3 | 0 | 0 | 0 | 0 | 0 | 17 | 37 | 53 | 63 | 77 | 100 | 100 |
| Ref. 3 | 0 | 0 | 23 | 60 | 100 | 100 | 100 | 100 | 100 | 100 | 100 | 100 |

TABLE III-continued

Foam heights (averages of 3 runs) in wash machine tests,
expressed in % of machine window height.

| Sample | 5 min | 10 min | 15 min | 20 min | 25 min | 30 min | 35 min | 40 min | 45 min | 50 min | 55 min | 60 min |
|---|---|---|---|---|---|---|---|---|---|---|---|---|
| Ref. 4 | 0 | 23 | 53 | 73 | 100 | 100 | 100 | 100 | 100 | 100 | 100 | 100 |
| Ref. 5 | 0 | 0 | 10 | 30 | 50 | 70 | 70 | 70 | 80 | 100 | 100 | 100 |

The table above shows that the antifoams using the resin-filler can depress foaming better than the reference examples using sillica fillers. In Example 3, for instance, foaming, does not begin for a full 30 minutes representing a significant improvement over the reference examples.

Example 4

Preparation of the Anti-foams

Antifoams of the Invention

Dispersions of premixes of the antifoam composition described in Example 1 and the antifoam composition described in Example 2 were made and tested in a Pulp & Paper hot black liquor pump test. Before the antifoam compositions were dispersed into thickened water, a premix was made with them by taking 5 g of the antifoam composition and mixing it with 1.67 g of a first silicone polyether, 0.83 g of a second silicone polyether and 0.23 g of Sipernet D13 treated silica. The first silicone polyether was OH endcapped having a 3132 Mw, with 22 dimethyl siloxane units to 2 polyether units; in the polyether group the EO/PO ratio is 12/0.12 The second silicone polyether was OH endcapped and had a 26,347 Mw, 108 dimethyl units to 10 polyether units; the EO/PO ratio in the polyether is 18/18. These mixtures were stirred by hand with a spatula until homogeneous. The premixes were then dispersed into a thickened water solution by stirring in 1.5 g of the premix into 8.5 g of an aqueous, 5 wt % Xanthum gum solution. Pump testing was done on each of the aqueous dispersions.

Control Compositions

Ref. 6: 78.7 g water and 10 g of a, 0.3 g Kathon LX 1.5%, and 0.5 g xanthan gum were combined while mixing. The branched siloxane fluid was prepared from 40 parts silica treated with hydrolysis products of dimethyl siloxane, hydroxy-terminated and polyethylsilicate; 0.8 parts dimethylcyclosiloxanes, 0.5 parts water and 59 parts dimethyl siloxane, trimethylsiloxy-terminated. 30 minutes after all xanthan gum was added, a mixture of 1 g. Sipernat D13 silica, 2 g silicone glycol surfactant, and 7 g Dow Corning® 5329 Performance Modifier (available from Dow Corning Corp., Midland, Mich.) were added during continuous mixing. This blend was mixed for 1 hour, and milled as necessary to remove lumpiness.

Ref. 7: To 91.2 g of tri-methyl endblocked linear siloxane fluid having a viscosity of 12,500 cst were added 5 g of 10 micron silica in increments of 1 g. To this mixture, 3 grams of a hydroxyl endblocked polydimethylsiloxane fluid having a viscosity of about 40 mm²/s at 25° C.; HO(Me$_2$Si)$_x$H where x is >10, average; —OH content of about 4.2 wt % were added. The composition was mixed for 4 minutes. To this blend was added 0.83 g of 20% KOH/water and the resulting composition was mixed at 80° C. for 1 hour. The composition was subjected to vacuum to remove any incorporated air.

Testing

Pump testing was done with synthetic black liquor and the premix containing the compounds were dosed at 45 ul using a 100ul syringe. The synthetic black liquor was prepared by mixing deionized water 89.97%; NaOH pellets 1.32%; Na2CO3 powder 1.98%; Oleic Acid 0.16%; Indulin C 3.94%; and Sugar 2.63%.

The black liquor was heated to a temperature of 177° F., pressure of 1 psi and air flow of 78–79 cc of N2 air flow. Following are the results with controls: just the black liquor (control), Ref. 6, Ref. 7, Exam. 1, and Exam. 2, shown in Table IV.

TABLE IV

| Time | Control | Ref. 6 | Ref. 7 | Exam. 1 | Exam. 2 |
|---|---|---|---|---|---|
| 15" | 26.0cm | 12.0 | 13.0 | 13.0 | 12.0 |
| 30" | 31.0 | 12.5 | 16.5 | 12.5 | 12.0 |
| 45" | 32.0 | 13.5 | 20.0 | 13.0 | 12.0 |
| 1' | 32.0 | 14.5 | 22.0 | 13.5 | 13.5 |
| 1'30" | 32.0 | 15.5 | 26.5 | 15.0 | 15.0 |
| 2' | 32.0 | 15.5 | 30.0 | 15.5 | 16.0 |
| 2'30" | 32.0 | 16.0 | 32.0 | 16.0 | 16.5 |
| 3' | 32.0 | 16.5 | 32.0 | 16.5 | 17.5 |
| 4' | 32.0 | 17.5 | 32.0 | 16.5 | 18.5 |
| 5' | 32.0 | 18.5 | 32.0 | 17.0 | 19.5 |
| 6' | 32.0 | 20. | 32.0 | 18.0 | 19.5 |
| 7' | 32.0 | 20.5 | 32.0 | 18.5 | 20.5 |
| 8' | 32.0 | 21.0 | 32.0 | 18.5 | 21.0 |
| 9' | 32.0 | 21.0 | 32.0 | 18.5 | 21.0 |
| 10' | 32.0 | 21.5 | 32.0 | 19.0 | 21.5 |
| T.ave | 31.5 | 17.1 | 27.7 | 16.1 | 17.1 |

The performance of the different materials in the pump test was determined by averaging the foam heights over the 10 minute time interval and ratio the results. Thus the compositions Exam. 1 and Exam. 2 compared to the controls as follows:

| Control | Ref. 6 | Ref. 7 | Exam. 1 | Exam. 2 |
|---|---|---|---|---|
| Baseline | 46% less foam | 12% less | 49% less | 46% less foam |

Example 4 showed that the resin fillers carried in polysiloxanes can be used together with a silica filler and silicone polyethers, and such mixed compositions demonstrated significant antifoam effects.

That which is claimed is:

1. A foam control composition comprising:

(I) a polysiloxane; and (II) a resin-filler comprising the reaction product of:

(A) a vinyl-functional MQ resin having an average general unit formula

wherein: $R^1$ is a hydroxyl group, $R^2$ is a monovalent hydrocarbon group having at least one unsaturated bond between at least two adjacent carbon atoms that is capable of addition reaction with a silicon-bonded hydrogen atom; each $R^3$ is independently selected from the group consisting of alkyl, aryl, and arylalkyl groups, a is a number from 0 to 0.2, b is a number from 0.02 to 1.50, and c is a number from 0 to 1.48, with the proviso that $1 \leq a+b+c \leq 1.5$; and (B) a substantially linear polydiorganosiloxane of empirical formula:

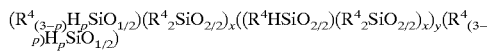

wherein each $R^4$ is a monovalent group independently selected from the group consisting of alkyl, aryl, and arylalkyl groups, p is 0 or 1, x ranges from 0 to 100, and y ranges from 0 to 70, with the proviso that at least two silicon-bonded hydrogen atoms are present in each molecule; and with the proviso that components (A) and (B) are present in amounts selected such that the reaction product thereof is insoluble in solvents; and (C) a catalyst.

2. A composition according to claim 1, wherein (I) is a siloxane having the unit formula:

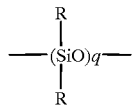

wherein R is independently selected from the group consisting of alkyl groups, aryl groups, and mixtures of alkyl and aryl groups, and q has a value ranging from 20 to 2,000.

3. A composition according to claim 1, wherein (I) is selected from the group consisting of dimethyl polysiloxane, diethyl polysiloxanes, dipropyl polysiloxanes, dibutyl polysiloxanes, methylethyl polysiloxanes, and phenylmethyl polysiloxanes.

4. A composition according to claim 1, wherein components (A) and (B) are present in amounts that provide a weight ratio (A):(B) in the range of 1.4:1 to 22:1.

5. A composition according to claim 4, wherein the ratio (A):(B) is 2.6:1 to 9.0:1.

6. A composition according to claim 1, wherein a is 0.03 to 0.1, b is 0.04 to 0.1, c is 1.18 to 1.33, $R^2$ is a vinyl group and $R^3$ is a methyl group.

7. A composition according to claim 1, wherein p is 0, x is 0 to 1, y is 6 to 15, and $R^4$ is a methyl group.

8. A composition according to claim 1, wherein the polysiloxane (I) is branched.

9. A composition according to claim 1, wherein the composition further comprises a compound selected from the group consisting of inorganic fillers, biocides, metal hydroxides, calcium hydroxides, magnesium hydroxides, flake-form fillers, epoxy-functional diorganopolysiloxanes, pigments, corrosion inhibitors, and dyes.

10. A composition according to claim 1, wherein the composition further comprises a liquid continuous phase selected from the group consisting of water, ethylene glycol, propylene glycol, polypropylene glycol, polyethylene glycol, copolymers of ethylene and propylene glycols, condensates of polypropylene glycol with polyols, condensates of polyethylene glycol with polyols, condensates of copolymers of ethylene and propylene glycols with polyols, alcohol alkoxylates, alkylphenol alkoxylates, silicone polyethers, and mixtures thereof.

11. A process of controlling foam, which includes the addition of an antifoam composition to a foaming medium, the improvement comprising adding the composition of claim 1 to said foaming medium.

12. A process of controlling foam, which includes the addition of an antifoam composition to a foaming medium, the improvement comprising adding the composition of claim 3 to said foaming medium.

13. The composition of claim 1, wherein the composition additionally comprises at least one surfactant.

* * * * *